United States Patent

Urano

(10) Patent No.: US 9,356,474 B2
(45) Date of Patent: May 31, 2016

(54) WIRELESS POWER FEEDER AND WIRELESS POWER TRANSMISSION SYSTEM

(71) Applicant: TDK Corporation, Tokyo (JP)

(72) Inventor: Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 778 days.

(21) Appl. No.: 13/628,758

(22) Filed: Sep. 27, 2012

(65) Prior Publication Data

US 2013/0093254 A1    Apr. 18, 2013

Related U.S. Application Data

(60) Provisional application No. 61/540,301, filed on Sep. 28, 2011.

(51) Int. Cl.
 *H02J 17/00*    (2006.01)
 *H02J 5/00*    (2016.01)

(52) U.S. Cl.
 CPC ....... *H02J 17/00* (2013.01); *H02J 5/005* (2013.01)

(58) Field of Classification Search
 CPC ........... H02J 5/005; H02J 7/025; H02J 17/00; H01F 38/14; B60L 11/182
 USPC .......................................................... 307/104
 See application file for complete search history.

(56) References Cited

U.S. PATENT DOCUMENTS

| | | | | |
|---|---|---|---|---|
| 5,124,518 A | * | 6/1992 | Lee ................................ | 219/718 |
| 5,490,450 A | * | 2/1996 | Lee .................................. | 99/337 |
| 5,777,864 A | * | 7/1998 | Seong et al. .................... | 363/98 |
| 2004/0229579 A1 | * | 11/2004 | Tsutsui et al. ............. | 455/127.2 |
| 2006/0214604 A1 | * | 9/2006 | Matsuura ............. | H05B 41/282 315/291 |
| 2008/0150445 A1 | * | 6/2008 | Ichikawa et al. .............. | 315/219 |
| 2008/0278264 A1 | | 11/2008 | Karalis et al. | |
| 2009/0072629 A1 | | 3/2009 | Cook et al. | |
| 2009/0243397 A1 | * | 10/2009 | Cook et al. ..................... | 307/104 |
| 2009/0272735 A1 | * | 11/2009 | Suenaga ................ | H05B 6/685 219/702 |
| 2010/0134099 A1 | * | 6/2010 | Hyodo et al. .................. | 324/239 |
| 2010/0176659 A1 | * | 7/2010 | Aoyama .................. | H02J 7/025 307/104 |
| 2010/0244577 A1 | * | 9/2010 | Shimokawa .......... | B60L 11/182 307/104 |
| 2010/0327804 A1 | | 12/2010 | Takahashi et al. | |
| 2011/0049997 A1 | * | 3/2011 | Urano ..................... | H02J 5/005 307/104 |

(Continued)

FOREIGN PATENT DOCUMENTS

| | | |
|---|---|---|
| JP | 10-243546 A | 9/1998 |
| JP | 11-164497 A | 6/1999 |

(Continued)

*Primary Examiner* — Thienvu Tran
*Assistant Examiner* — Brian K Baxter
(74) *Attorney, Agent, or Firm* — McDermott Will & Emery LLP

(57) ABSTRACT

A feeding coil circuit 120 feeds power by wireless from a feeding coil L2 to a receiving coil L3 based on a magnetic field resonance phenomenon between the feeding coil L2 and receiving coil L3. A transmission power control circuit 200 supplies AC power at a drive frequency to the feeding coil L2 to make the feeding coil L2 feed the AC power to the receiving coil L3. A phase detection circuit 114 measures a phase difference between a current phase of the AC power and a voltage phase thereof. The power transmission control circuit 200 adjusts the drive frequency in accordance with the phase difference. A protection circuit 122 adjusts the phase difference in an increasing direction when the current flowing in the feeding coil L2 increases.

5 Claims, 20 Drawing Sheets

(56) References Cited

U.S. PATENT DOCUMENTS

| | | | |
|---|---|---|---|
| 2011/0080053 A1* | 4/2011 | Urano | 307/104 |
| 2011/0101791 A1* | 5/2011 | Urano | H02J 5/005 |
| | | | 307/104 |
| 2011/0127846 A1* | 6/2011 | Urano | H02J 5/005 |
| | | | 307/104 |
| 2011/0184680 A1* | 7/2011 | Imaizumi | G01R 27/02 |
| | | | 702/65 |
| 2011/0227420 A1* | 9/2011 | Urano | 307/104 |
| 2013/0043735 A1* | 2/2013 | Low | H04B 5/0012 |
| | | | 307/104 |
| 2013/0043951 A1* | 2/2013 | Irish | H03F 1/523 |
| | | | 330/285 |

FOREIGN PATENT DOCUMENTS

| | | |
|---|---|---|
| JP | 2001-112189 A | 4/2001 |
| JP | 2006-230032 A | 8/2006 |
| JP | 2010-136543 A | 6/2010 |
| JP | 2011-010443 A | 1/2011 |
| WO | WO-2006/022365 A1 | 3/2006 |

* cited by examiner

WIRELESS POWER FEEDER AND WIRELESS POWER TRANSMISSION SYSTEM

CROSS-REFERENCE TO RELATED APPLICATION

The present application claims priority from provisional patent application No. 61/540,301 filed on Sep. 28, 2011.

BACKGROUND OF THE INVENTION

1. Field of the Invention

The present invention relates to wireless power feeding and, more particularly, to overcurrent protection therefor.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range. The type (B) utilizing radio wave is available in a long range; however, it has small electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. Hereinafter, the type (C) is referred to as "magnetic field resonance type".

The magnetic field resonance type is based on a theory published by Massachusetts Institute of Technology in 2006 (refer to U.S. Patent Application Publication No. 2008/0278264). In U.S. Patent Application Publication No. 2008/0278264, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, high current flows in the receiving coil. At this time, current also flows in the loading coil according to the principle of electromagnetic induction, and power is taken from a load connected in series to the loading coil. By utilizing the magnetic field resonance phenomenon, high power transmission efficiency can be achieved even if the feeding coil and receiving coil are largely spaced from each other (refer to U.S. Patent Application Publication No. 2009/0072629).

In the wireless power feeding, high current (overcurrent) may flow in a power feeding side when a distance between the feeding coil and receiving coil is large. In a non-contact power feeder disclosed in Jpn. Pat. Appln. Laid-Open Publication No. 11-164497, power is fed to a pickup coil in a non-contact manner.

Temperature of the pickup coil is monitored by a temperature sensor, and an abnormal signal is output when a level of an output of the temperature sensor exceeds a certain value. The temperature of the pickup coil increases when the high current flows in the pickup coil. That is, the overcurrent can be detected by the increase in the temperature of the pickup coil. In a case of occurrence of the overcurrent, the pickup coil is short-circuited to stop power supply.

In an invention disclosed in Jpn. Pat. Appln. Laid-Open Publication No. 11-164497, the temperature sensor needs to be mounted to the coil. Further, this invention provides a method that monitors not a current value itself, but an increase in temperature associated with an increase in current, so that responsiveness in the overcurrent detection is low. This may cause a high load on an electronic circuit during a time period from when the overcurrent starts flowing until a protection function is activated.

The present invention has been made in view of the above problem, and a main object thereof is to achieve protection of an electronic circuit against the overcurrent in wireless power feeding with a simple configuration.

SUMMARY

A wireless power feeder according to the present invention feeds power by wireless from a feeding coil to a receiving coil. The wireless power feeder includes: the feeding coil; a power transmission control circuit that supplies AC power at a drive frequency to the feeding coil to make the feeding coil feed the AC power to the receiving coil; a phase detection circuit that detects a phase difference between a voltage phase of the AC power and a current phase thereof; and a protection circuit that monitors current flowing in the feeding coil. The power transmission control circuit adjusts the drive frequency in accordance with the detected phase difference. The protection circuit adjusts the detected phase difference in an increasing direction when the current flowing in the feeding coil increases.

A wireless power transmission system according to the present invention feeds power by wireless from a feeding coil to a receiving coil. The system includes: the feeding coil; a power transmission control circuit that supplies AC power at a drive frequency to the feeding coil to make the feeding coil feed the AC power to the receiving coil; a phase detection circuit that detects a phase difference between a voltage phase of the AC power and a current phase thereof; a protection circuit that monitors current flowing in the feeding coil; the receiving coil; and a load circuit that includes a loading coil that is magnetically coupled to the receiving coil to receive the AC power from the receiving coil and a load that receives power from the loading coil. The power transmission control circuit adjusts the drive frequency in accordance with the detected phase difference. The protection circuit adjusts the detected phase difference in an increasing direction when the current flowing in the feeding coil increases.

According to the present invention, the electronic circuit can be easily protected against the over current in wireless power feeding with a simple configuration.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be described below with reference to the accompanying drawings.

First Embodiment

Figure 1:
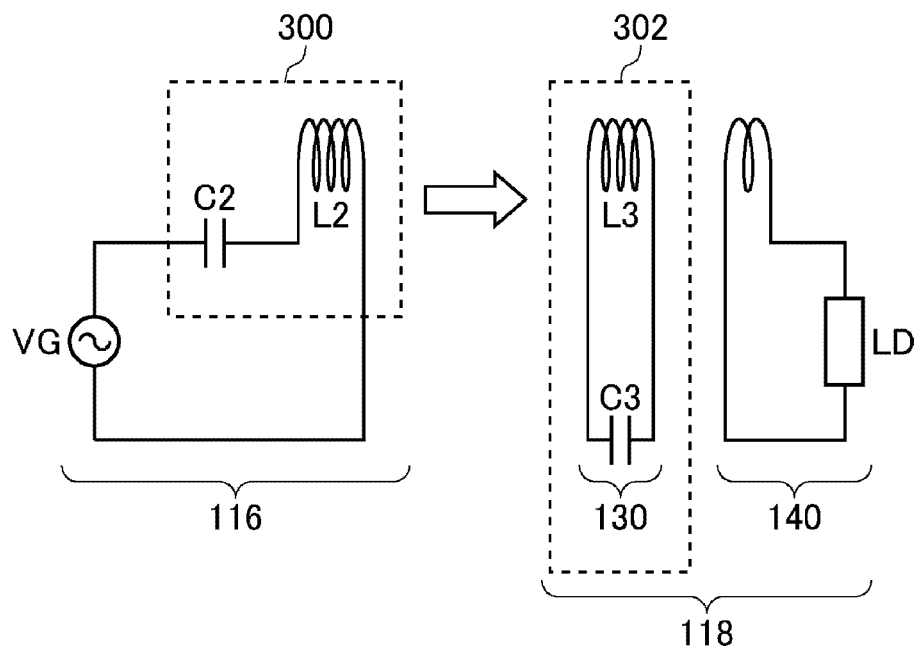
FIG. 1 is a view illustrating operation principle of a wireless power transmission system according to a first embodiment of the present invention.

FIG. 1 is a view illustrating operation principle of a wireless power transmission system 100 according to a first embodiment. The wireless power transmission system 100 of the first embodiment includes a wireless power feeder 116 and a wireless power receiver 118. The wireless power feeder 116 includes a power feeding LC resonance circuit 300. The wireless power receiver 118 includes a receiving coil circuit 130 and a load circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, power feeding coil L2, capacitor C3, and power receiving coil L3 are set such that the resonance frequencies of the power feeding LC resonance circuit 300 and power receiving LC resonance circuit 302 coincide with each other in a state where the power feeding coil L2 and power receiving coil L3 are disposed away from each other far enough to ignore the magnetic field coupling therebetween. This common resonance frequency is assumed to be fr0.

In a state where the power feeding coil L2 and power receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting a part of the new resonance circuit resonates at a resonance point 1 (resonance frequency fr1). When the power feeding LC resonance circuit 300 resonates, the power feeding coil L2 generates an AC magnetic field of the resonance frequency fr1. The power receiving LC resonance circuit 302 constituting apart of the new resonance circuit also resonates by receiving the AC magnetic field. When the power feeding LC resonance circuit 300 and power receiving LC resonance circuit 302 resonate at the same resonance frequency fr1, wireless power feeding from the power feeding coil L2 to power receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

Figure 2:
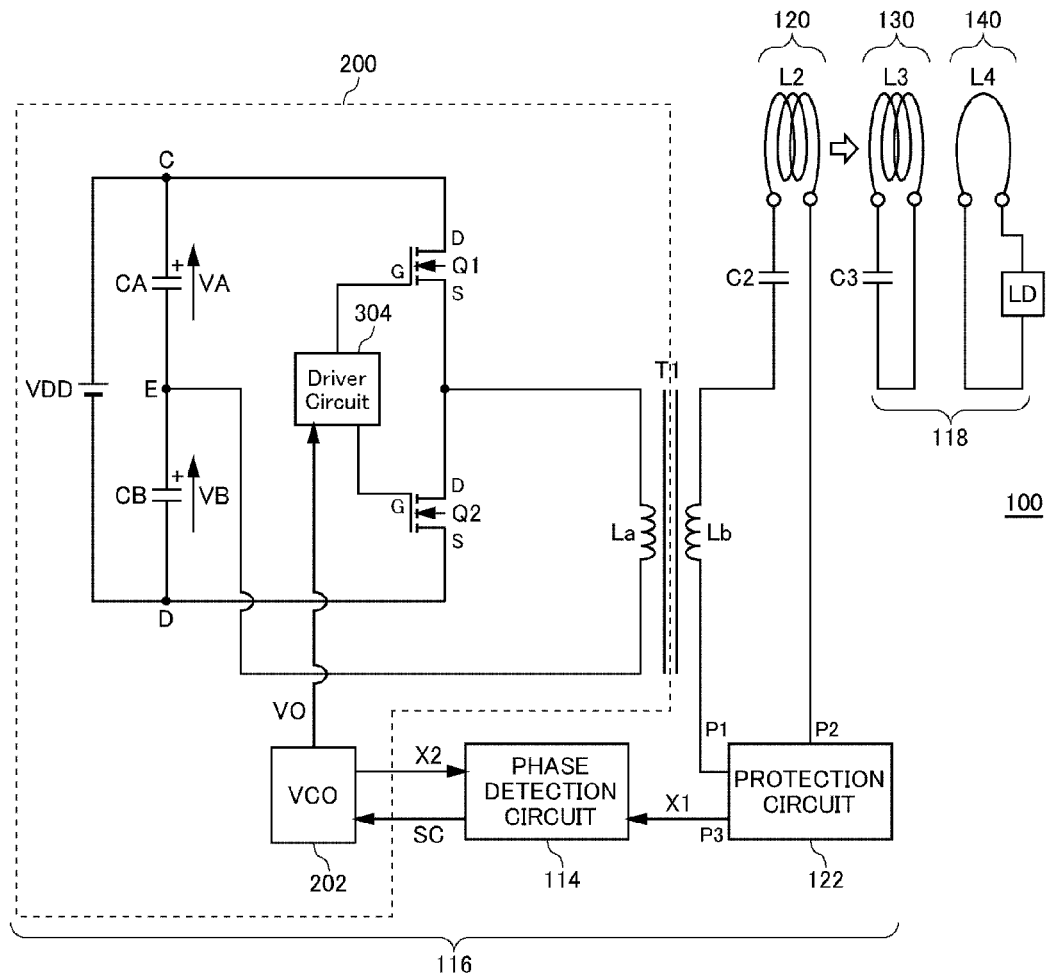
FIG. 2 is a system configuration view of the wireless transmission system.

FIG. 2 is a system configuration view of the wireless power transmission system 100. The wireless power transmission system 100 includes a wireless power feeder 116 and a wireless power receiver 118. The wireless power feeder 116 includes, as basic components, a power transmission control circuit 200, a feeding coil circuit 120, a phase detection circuit 114, and a protection circuit 122. The wireless power receiver 118 includes, as basic components, a receiving coil circuit 130 and a load circuit 140. The wireless power feeder 116 in the present embodiment directly drives the feeding coil L2, not through an exciting coil.

The feeding coil circuit 120 is a circuit in which the feeding coil L2, capacitor C2, and a transformer T1 secondary coil Lb are connected in series. Values of the feeding coil L2 and capacitor C2 are respectively set such that a resonance frequency of the feeding coil circuit 120 is fr1. The transformer T1 secondary coil Lb constitutes a coupling transformer T1 together with a transformer T1 primary coil La and receives AC power from the power transmission control circuit 200 by electromagnetic induction. The feeding coil circuit 120 is connected to the protection circuit 122 through terminals P1 and P2.

The receiving coil circuit 130 is a circuit in which a receiving coil L3 and a capacitor C3 are connected in series. The feeding coil L2 and receiving coil L3 face each other. The values of the receiving coil L3 and capacitor C3 are respectively set such that a resonance frequency of the receiving coil circuit 130 is fr1.

In the load circuit 140, a loading coil L4 is connected in series to a load LD. The receiving coil L3 and loading coil L4 are electromagnetically coupled. When AC current flows in the receiving coil L3, an electromotive force occurs in the load circuit 140.

A VCO (Voltage Controlled Oscillator) 202 included in the power transmission control circuit 200 functions as an "oscillator" that generates AC voltage VO at a drive frequency fo. Although a waveform of the AC voltage VO may be a sine wave, it is assumed here that the voltage waveform is a rectangular wave (digital waveform). The AC voltage VO is input to a driver circuit 304. The VCO 202 dynamically changes the drive frequency fo based on a phase difference voltage SC (to be described later) output from the phase detection circuit 114.

The power transmission control circuit 200 uses, as its power supply, capacitors CA and CB charged by DC power supply VDD. The capacitor CA is provided between points C and E, and the capacitor CB is provided between points E and D as illustrated in FIG. 2. Assuming that voltage (voltage between the points C and E) of the capacitor CA is VA, voltage (voltage between the points E and D) of the capacitor CB is VB, VA+VB (voltage between the points C and D) represents input voltage. The capacitors CA and CB each function as a DC voltage source.

The driver circuit 304 alternately turns ON/OFF switching transistors Q1 and Q2 depending on the drive frequency fo (AC voltage VO). A drain of the switching transistor Q1 is connected to a positive terminal of the capacitor CA. A negative terminal of the capacitor CA is connected to a source of the switching transistor Q1 through the transformer T1 primary coil La. A source of the switching transistor Q2 is connected to a negative terminal of the capacitor CB. A positive terminal of the capacitor CB is connected to a drain of the switching transistor Q2 through the transformer T1 primary coil La.

When the switching transistor Q1 is turned conductive (ON), the switching transistor Q2 is turned non-conductive (OFF). When the switching transistor Q2 is turned conductive (ON), the switching transistor Q1 is turned non-conductive (OFF). The on/off control of the switching transistors Q1 and Q2 allows the power transmission control circuit 200 to supply AC power of the drive frequency fo to the feeding coil circuit 120.

The closer the value of the drive frequency fo is to the resonance frequency fr1, the higher the power transmission efficiency becomes. When the drive frequency fo coincides with the resonance frequency fr1, the feeding coil L2 and capacitor C2 are in a resonance state. The receiving coil circuit 130 is also a part of a resonance circuit of the resonance frequency fr1, so that the feeding coil L2 and receiving coil L3 magnetically resonate. At this time, the maximum transmission efficiency can be obtained.

When the resonance frequency fr1 and drive frequency fo coincide with each other, a current phase of the feeding coil L2 and a voltage phase of the AC voltage VO also coincide with each other. A deviation between the resonance frequency fr1 and drive frequency fo can be measured from a phase difference between the current phase and voltage phase. The wireless power transmission system 100 in the present embodiment measures the deviation between the resonance frequency fr1 and drive frequency fo based on the phase difference to thereby make the drive frequency fo track the resonance frequency fr1.

The current phase of the feeding coil circuit 120 is detected by the protection circuit 122 and is input to the phase detection circuit 114 as an X1 signal. The voltage phase of the AC voltage VO generated by the VCO 202 is input to the phase detection circuit 114 as an X2 signal. The phase detection circuit 114 detects the phase difference between the current phase (X1 signal) and voltage phase (X2 signal) and outputs the phase difference voltage SC indicating a magnitude of the phase difference. The VCO 202 controls the drive frequency fo so as to reduce the phase difference between the current phase and voltage phase according to the phase difference voltage SC.

The phase difference becomes larger as the deviation between the drive frequency fo and resonance frequency fr1 becomes larger. For example, when the current phase advances with respect to the voltage phase, the phase detection circuit 114 generates the phase difference voltage SC indicating how much the current phase advances with respect to the voltage phase. The VCO 202 adjusts the drive frequency fo so as to reduce the phase difference. As described above, even when the resonance frequency fr1 changes to cause the phase difference, the drive frequency fo is adjusted so as to reduce/eliminate the phase difference.

The protection circuit 122 is connected to the feeding coil circuit 120 through the terminals P1 and P2 and detects a phase of current flowing in the feeding coil circuit 120 and magnitude thereof. When high current flows in the feeding coil circuit 120, the protection circuit 122 exercises ex-post facto adjustment of the X1 signal. Specifically, when a level of current flowing in the feeding coil circuit 120 is equal to or higher than a certain value, the protection circuit 122 outputs the X1 signal indicating that the current phase delays even if the current phase advances with respect to the voltage phase. At this time, the phase detection circuit 114 instructs the VCO 202 to delay the voltage phase (to advance the current phase). The VCO 202 delays the voltage phase although it is actually necessary for the VCO 202 to advance the voltage phase in order to make the drive frequency fo track the resonance frequency fr1, so that the actual phase difference becomes large. By intentionally reducing the power transmission efficiency under such control, the current flowing in the feeding coil circuit 120 is suppressed. A concrete configuration of the protection circuit 122 and a concrete control method will be described later with reference to FIGS. 4 and 5.

Figure 3:
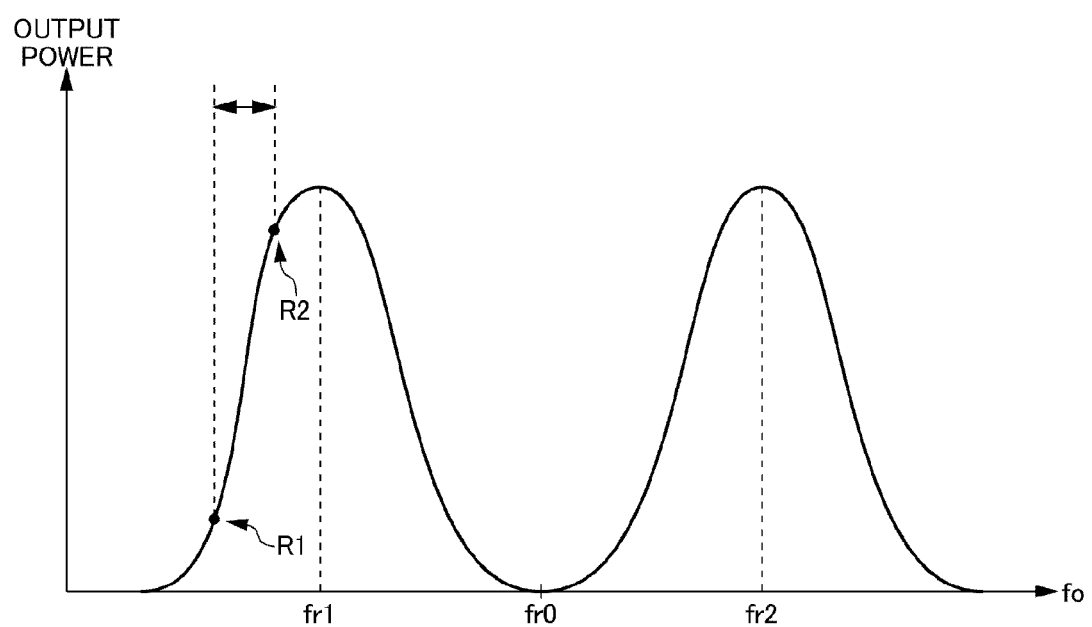
FIG. 3 is a graph illustrating a relationship between a drive frequency and output power in the wireless power transmission system.

FIG. 3 is a graph illustrating a relationship between the drive frequency and output power in the wireless power transmission system. As described above, output power, i.e., the power transmission efficiency becomes maximum at the two resonance frequencies fr1 and fr2. In the present embodiment, the drive frequency fo is controlled in a range of R1 to R2 on a lower frequency side than the resonance frequency fr1. Normally, the drive frequency fo is set not to the resonance frequency fr1, but to R2 closer to the resonance frequency fr1; however, when the overcurrent is detected, the drive frequency fo is reduced toward the R1.

Figure 4:
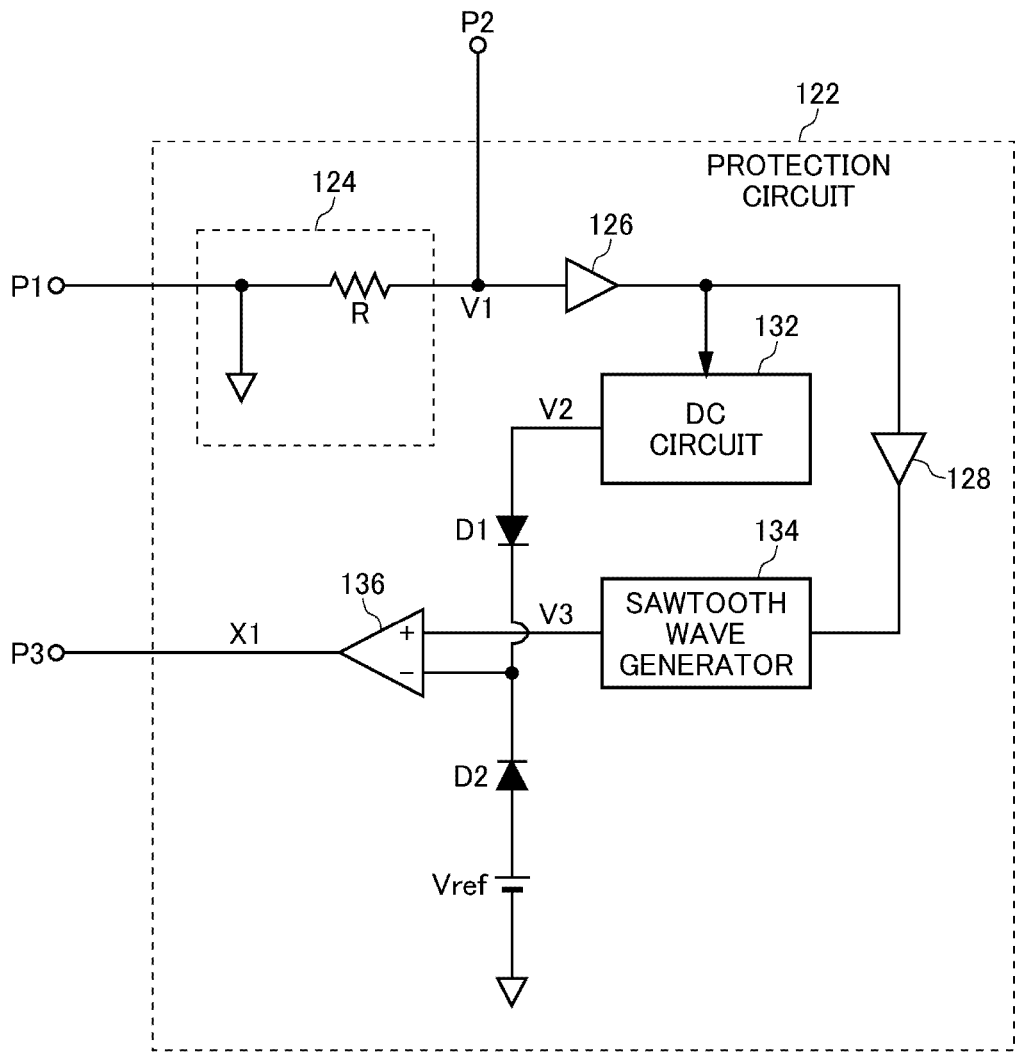
FIG. 4 is a circuit diagram illustrating a protection circuit.

FIG. 4 is a circuit diagram of the protection circuit 122. A current detection circuit 124 included in the protection circuit 122 measures voltage between the terminals P1 and P2 connected to the feeding coil circuit 120 across a resistor R to thereby measure the magnitude and phase of the current in the feeding coil circuit 120. Although a current measurement method in which the current detection circuit 124 uses the resistor is adopted in the present embodiment, a method that indirectly measure a magnetic flux by magneto-electric conversion using a current transformer, etc., or a method that directly measures a magnetic flux using a magnetic sensor such as a hall element or a TMR element may be adopted.

AC voltage V1 thus measured is amplified by an amplifier circuit 126 and then divided into two channels. In the first channel, the amplified AC voltage V1 is converted into DC voltage V2 (first current level signal) by a DC circuit 132 and input to an inverting terminal of a comparator 136 through a diode D1. DC voltage Vref (reference level signal) is also input to the inverting terminal of the comparator 136 through a diode D2. That is, voltage selected through diode-ORing between the DC voltage V2 and DC voltage Vref, in other words, higher one of the DC voltage V2 and DC voltage Vref is input. It follows that voltage equal to or higher than the DC voltage Vref is input to the inverting terminal of the comparator 136.

On the other hand, in the second channel, the amplified AC voltage V1 is shaped into a rectangular wave by an amplifier circuit 128, further shaped into saw-tooth wave voltage signal V3 (second current level signal) by a saw tooth wave generator 134, and then input to a non-inverting terminal of the comparator 136. The comparator 136 outputs a difference between the V3 and higher one of the V2 and Vref from a terminal P3 as the X1 signal.

Figure 5:
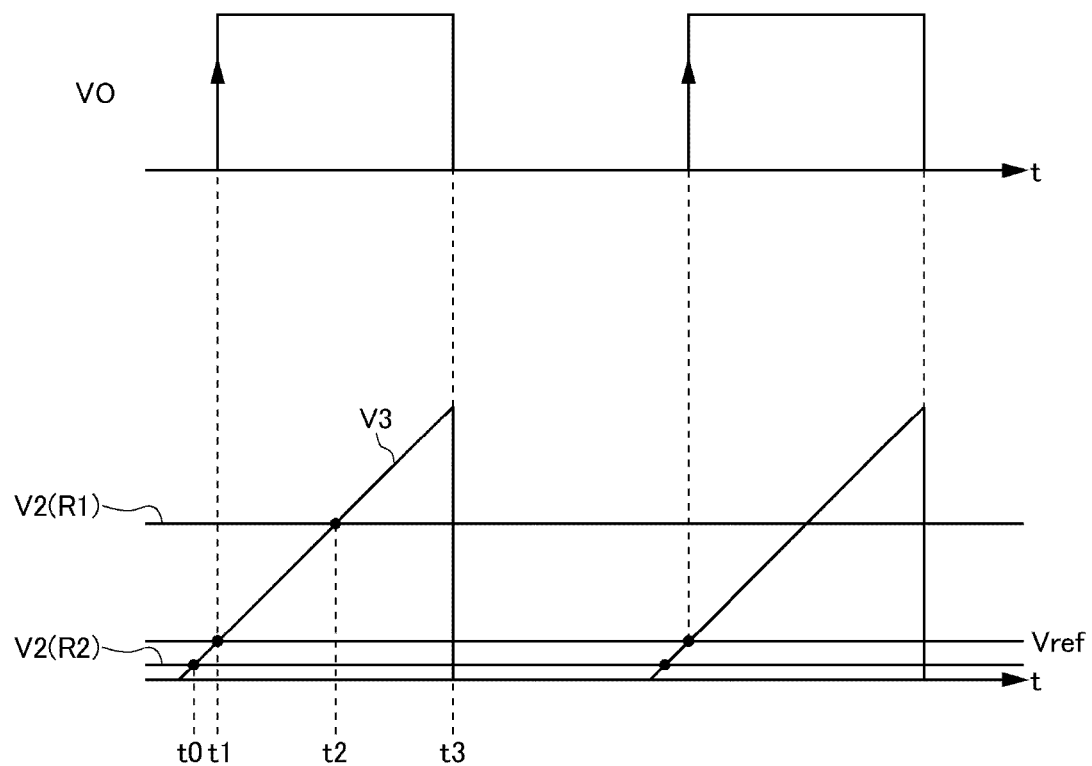
FIG. 5 is a time chart representing a voltage/current phase changing process.

FIG. 5 is a time chart representing a voltage/current phase changing process. The AC voltage VO generated by the VCO 202 is a rectangular wave having a rising edge at time t1 and a falling edge at time t3. The saw-tooth wave V3 represents a change in a level of the current flowing in the feeding coil circuit 120. If there is no phase difference, the rising edge of the V3 (current) and rising edge of the VO (voltage) coincide with each other. However, in FIG. 5, the V3 has the rising edge at time t0 earlier than time t1.

When the current flowing in the feeding coil circuit 120 is low, that is, when V2<Vref, the X1 signal output from the comparator 136 of the protection circuit 122 outputs positive voltage at a timing when V3>Vref. With regard to the V2 (R2) of FIG. 5, the timing when V3>Vref is the time t1, so that the phase detection circuit 114 recognizes that the current phase and voltage phase coincide with each other, and the VCO 202 does not adjust the drive frequency fo. Normally, V2<Vref, so that phase adjustment is made such that the rising edge (t0) of the current phase actually slightly advances with respect to the rising edge (t1) of the voltage phase.

When a Q-value becomes large due to, e.g., an increase in distance between the feeding coil L2 and receiving coil L3, high current (overcurrent) flows in the feeding coil circuit 120. At this time, V2>Vref. With regard to the V2 (R1) of FIG. 5, the timing when V3>V2 is the time t2 later than the time t1, so that the phase detection circuit 114 recognizes that the current phase significantly delays although the current phase actually advances with respect to the voltage phase. The VCO 202 adjusts the drive frequency fo in a direction that the current phase advances, resulting in an increase in the phase difference.

In short, upon occurrence of the overcurrent, the phase detection circuit 114 is made to falsely recognize that the current phase significantly delays with respect to the voltage phase, and the VCO 202 delays the voltage phase (advances the current phase), increasing the actual phase difference between the current phase and voltage phase to reduce the power transmission efficiency. As a result, the current flowing in the feeding coil 120 is suppressed.

Second Embodiment

Figure 6:
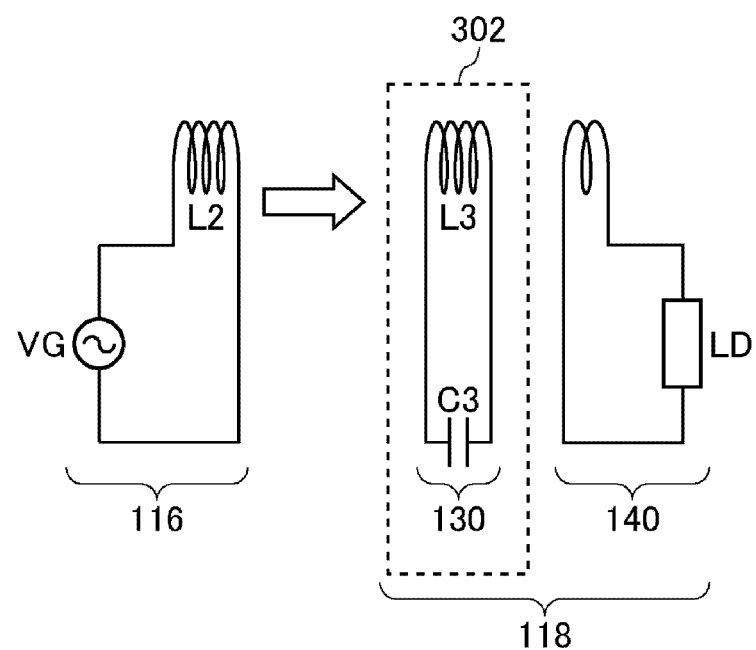
FIG. 6 is a view illustrating operation principle of a wireless power transmission system according to a second embodiment of the present invention.

FIG. 6 is a view illustrating operation principle of the wireless power transmission system 100 according to a second embodiment. The wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 116. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The feeding coil L2 does not constitute the power feeding LC resonance circuit, so that the wireless power feeder 116 does not enter the resonance state at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

Application

The following describes a configuration in which the wireless power transmission system 100 described in the first and/or second embodiments is applied to a wireless headphone system 102.

Figure 7:
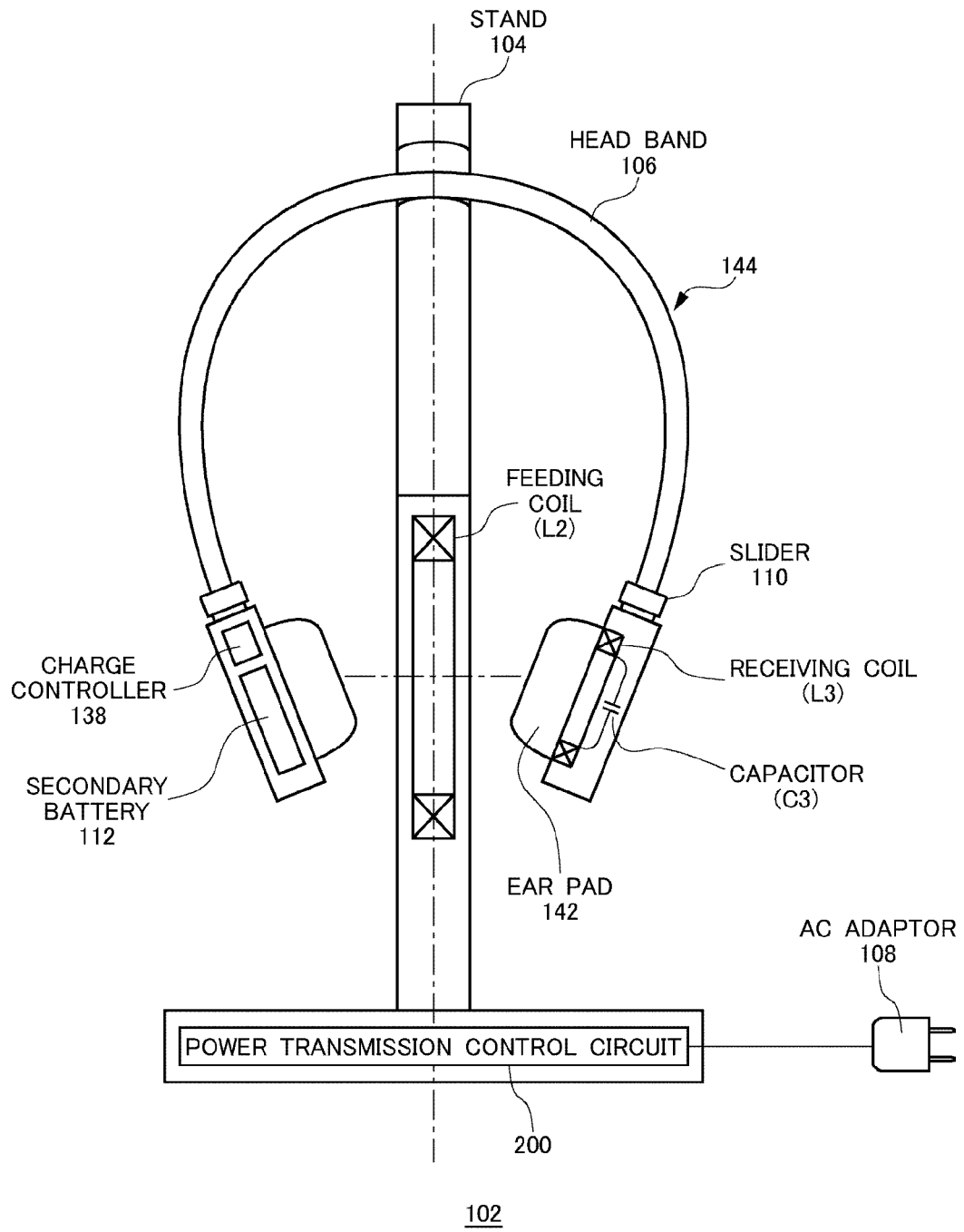
FIG. 7 is a system configuration diagram of a wireless headphone system charged by wireless power feeding.

FIG. 7 is a system configuration diagram of the wireless headphone system 102 charged by wireless power feeding. The wireless headphone system 102 includes a stand 104 and a headphone 144. The stand 104 corresponds to the wireless power feeder 116 and incorporates the feeding coil L2 and power transmission control circuit 200. An AC adapter 108 converts AC voltage into DC voltage and supplies the DC voltage to the power transmission control circuit 200. The stand 104 feeds AC current from the feeding coil L2 at the driving frequency fo by wireless.

The headphone 144 corresponds to the wireless power receiver 118. A size of a head band 106 in the head phone 144 can be adjusted by a slider 110. One of two ear pads 142 of the headphone 144 incorporates the receiving coil circuit 130 (receiving coil L3 and capacitor C3) and loading coil L4 (not illustrated) and the other one thereof incorporates a secondary battery 112 and a charge controller 138. AC power fed by wireless from the feeding coil L2 is received by the receiving coil L3 and the not illustrated loading coil L4. The power received by the loading coil L4 is supplied to the secondary battery 112 through a wiring incorporated in the head band 106. The charge controller 138 converts the AC power received by the receiving coil L3 and loading coil L4 into DC power and supplies the DC power to the secondary battery 112. The charge controller 138 stops power supply to the secondary battery 112 when the secondary battery 112 is in a full charged state.

The headphone 144 receives audio information supplied from a stereo by wireless by a not illustrated receiver (incorporated in the ear pad 142, etc.) and reproduces the audio information from a player (not illustrated) incorporated in the ear pad 142. When the head band 106 is set on the stand 104, the feeding coil L2 and receiving coil L3 face each other as illustrated in FIG. 7. In this state, power is supplied by wireless from the feeding coil L2 to receiving coil L3 to charge the secondary battery 112.

Figure 8:
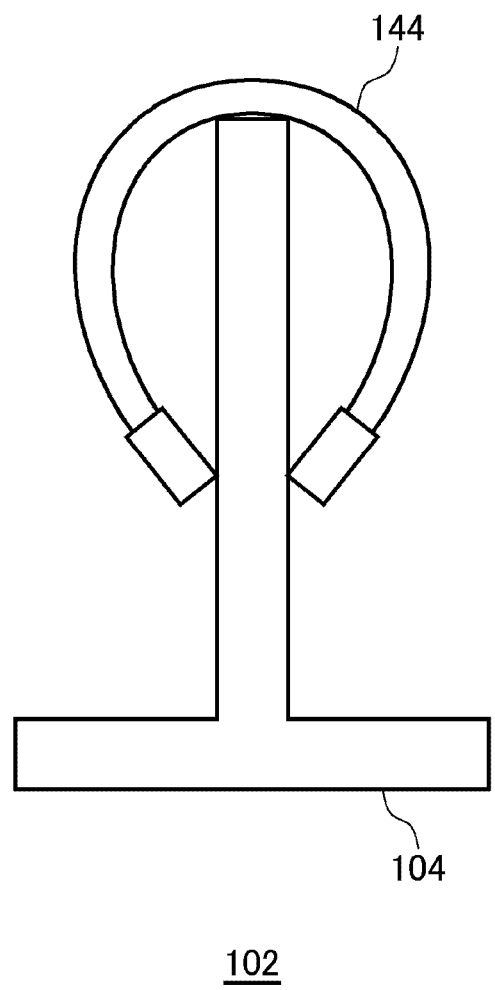
FIG. 8 is a view illustrating a state where a headphone is normally set on a stand.
Figure 9:
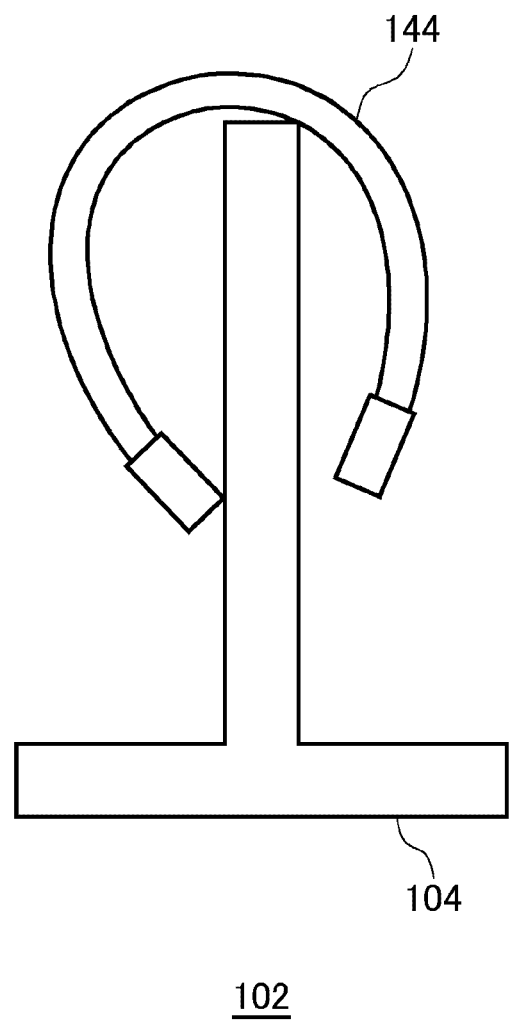
FIG. 9 is a view illustrating a state where the headphone on the stand is inclined to one side.
Figure 10:
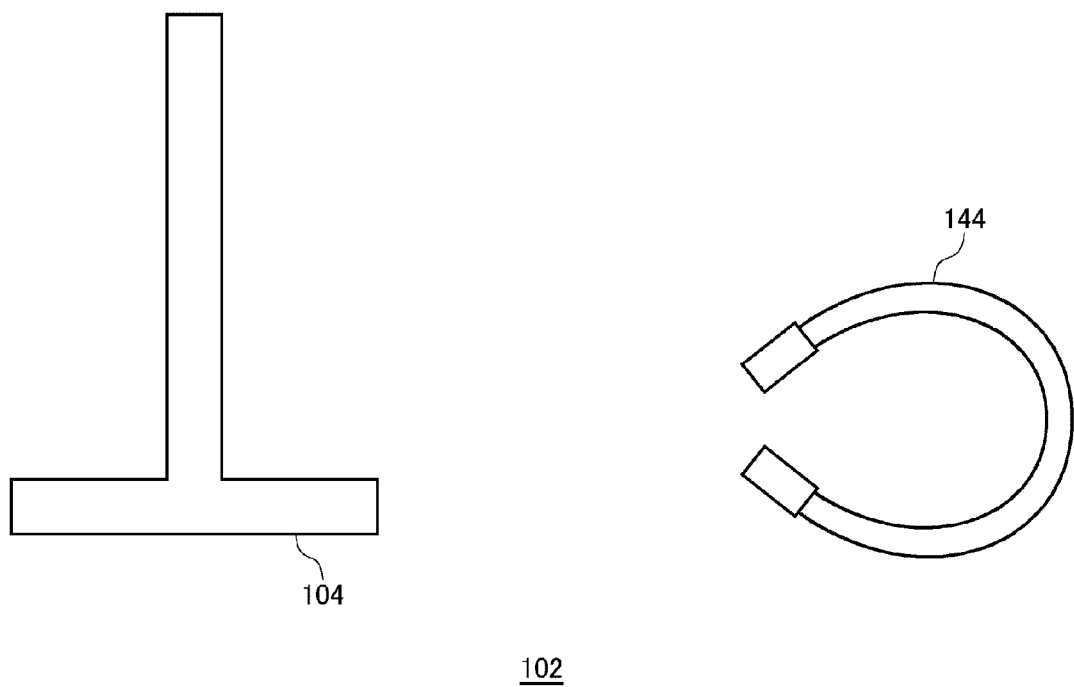
FIG. 10 is a view illustrating a state where the headphone is removed from the stand.

FIG. 8 is a view illustrating a state where the headphone 144 is normally set on the stand 104. In this state, wireless power feeding from the stand 104 to the headphone 144 is normally executed. Such a normal positional relationship is referred to as "normal arrangement". FIG. 9 is a view illustrating a state where the headphone 144 on the stand 104 is inclined to one side. In this state, although the resonance frequency fr1 changes to reduce the power transmission efficiency as compared to the normal arrangement, the wireless power feeding is possible. FIG. 10 is a view illustrating a state where the headphone 144 is removed from the stand 104. In this state, the Q-value becomes high, so that the overcurrent easily flows in the feeding coil circuit 120.

Figure 11:
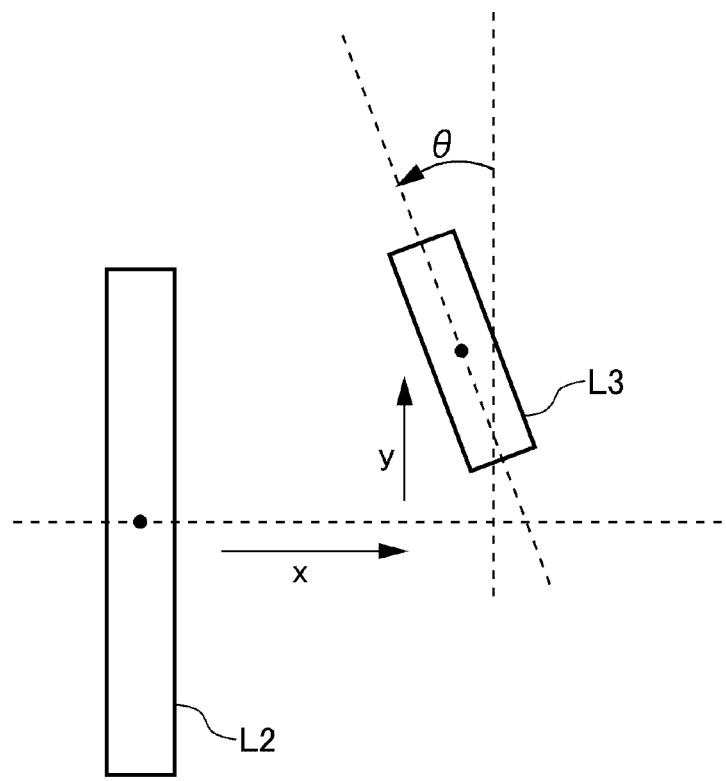
FIG. 11 is a view illustrating a positional relationship between the feeding coil and receiving coil.

FIG. 11 is a view illustrating a positional relationship between the feeding coil L2 and receiving coil L3. It is assumed that a distance between the feeding coil L2 and receiving coil L3 is x, a shift along a coil surface direction is y, and an angle between coil surfaces of the receiving coil L3 and feeding coil L2 is θ. Hereinafter, a relationship between each of the above three parameters and the power transmission efficiency will be described.

Figure 12:
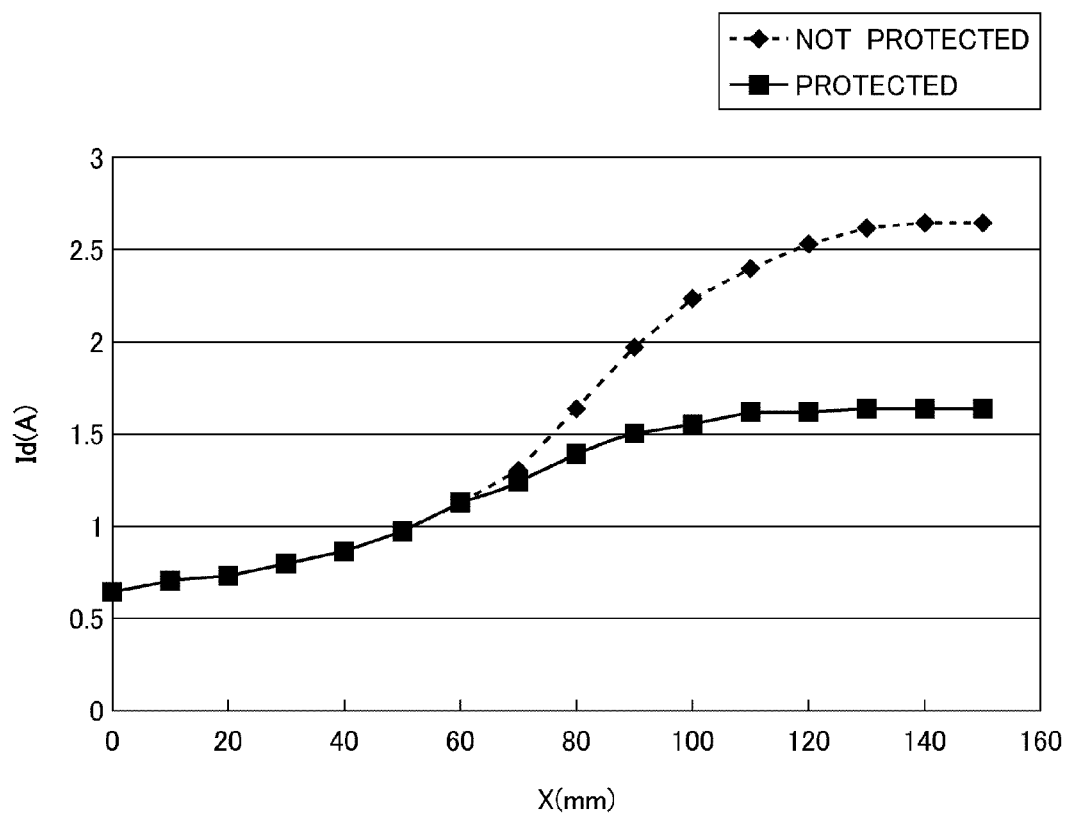
FIG. 12 is a graph representing a relationship between source/drain current and a parameter x.
Figure 13:
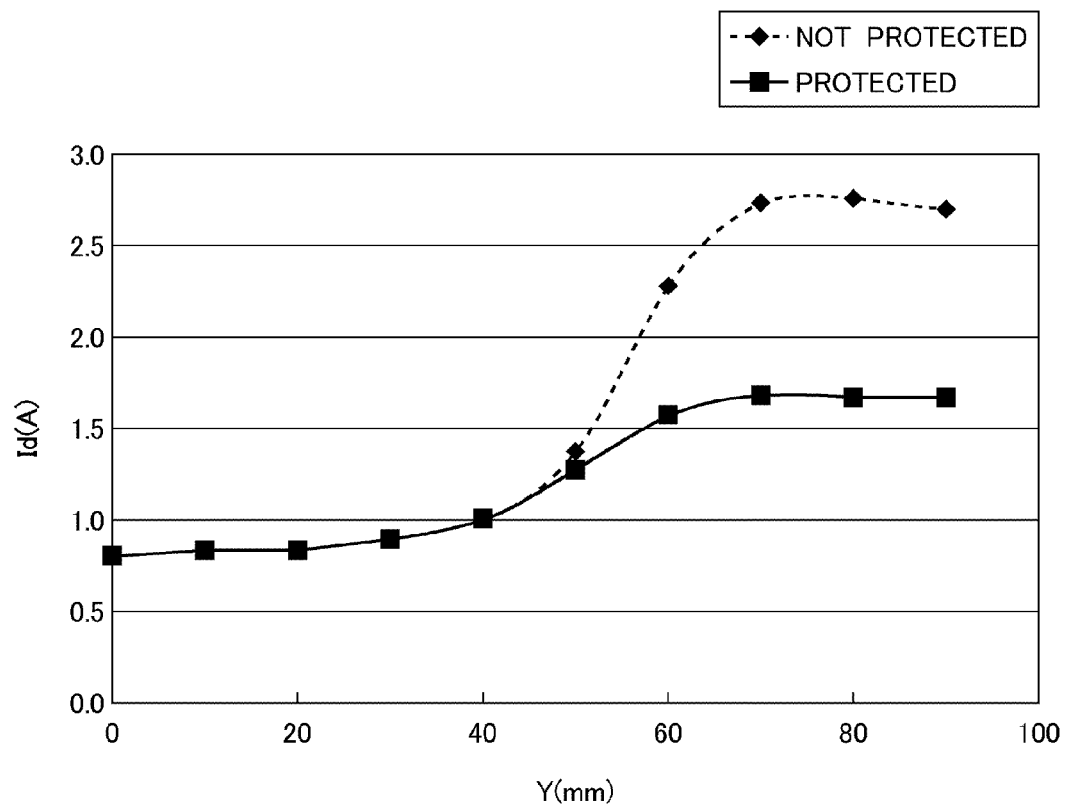
FIG. 13 is a graph representing a relationship between the source/drain current and a parameter y.
Figure 14:
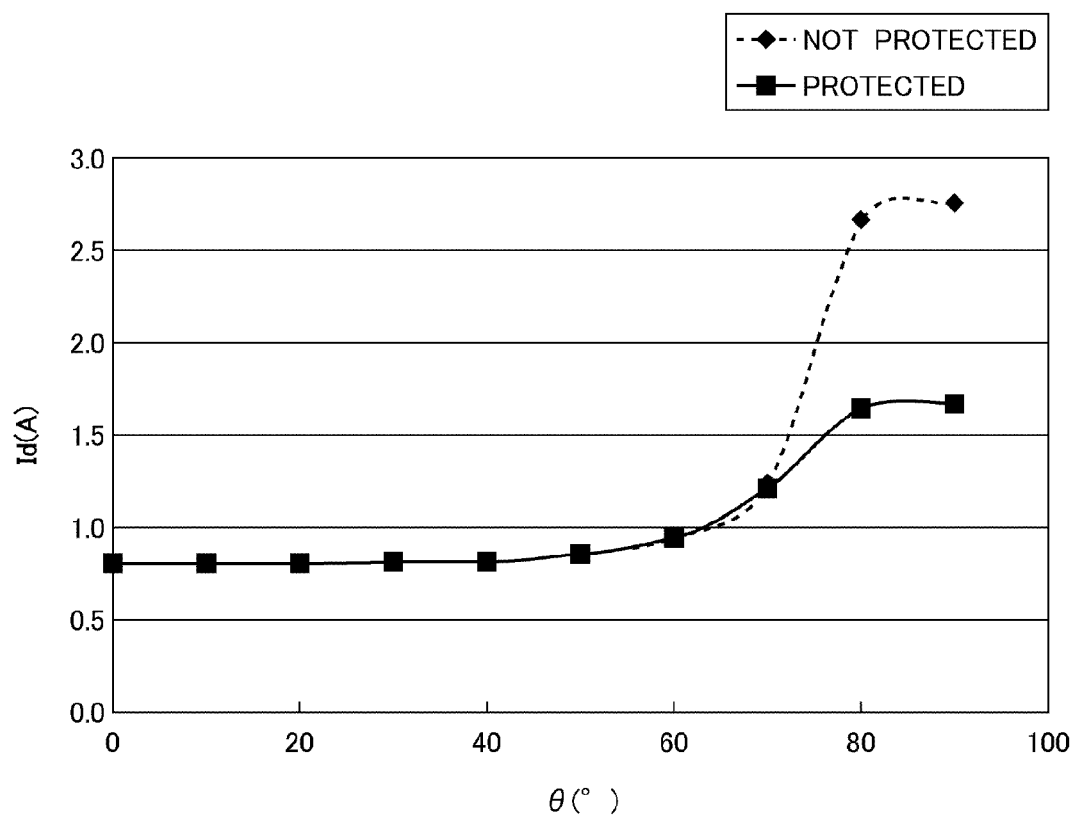
FIG. 14 is a graph representing a relationship between the source/drain current and a parameter θ.

FIGS. 12 to 14 are each a graph representing a relationship between each of the above three parameters and a source/drain current flowing in the switching transistor Q1. A solid line represents a case where a protection function of the protection circuit 122 is activated, and a dashed line represents a case where the protection function is not activated. With regard to any of x, y, and θ, the overcurrent occurs in the switching transistor Q1 or feeding coil circuit 120 when the positional relationship between the feeding coil L2 and receiving coil L3 is shifted from the normal opposing arrangement (see FIG. 8). Then, the protection circuit 122 detects the overcurrent and exercises ex-post facto adjustment of the X1 signal. The VCO 202 makes the drive frequency fo significantly deviate from the resonance frequency fr1 based on the adjusted X1 signal to thereby suppress current to be supplied.

Figure 15:
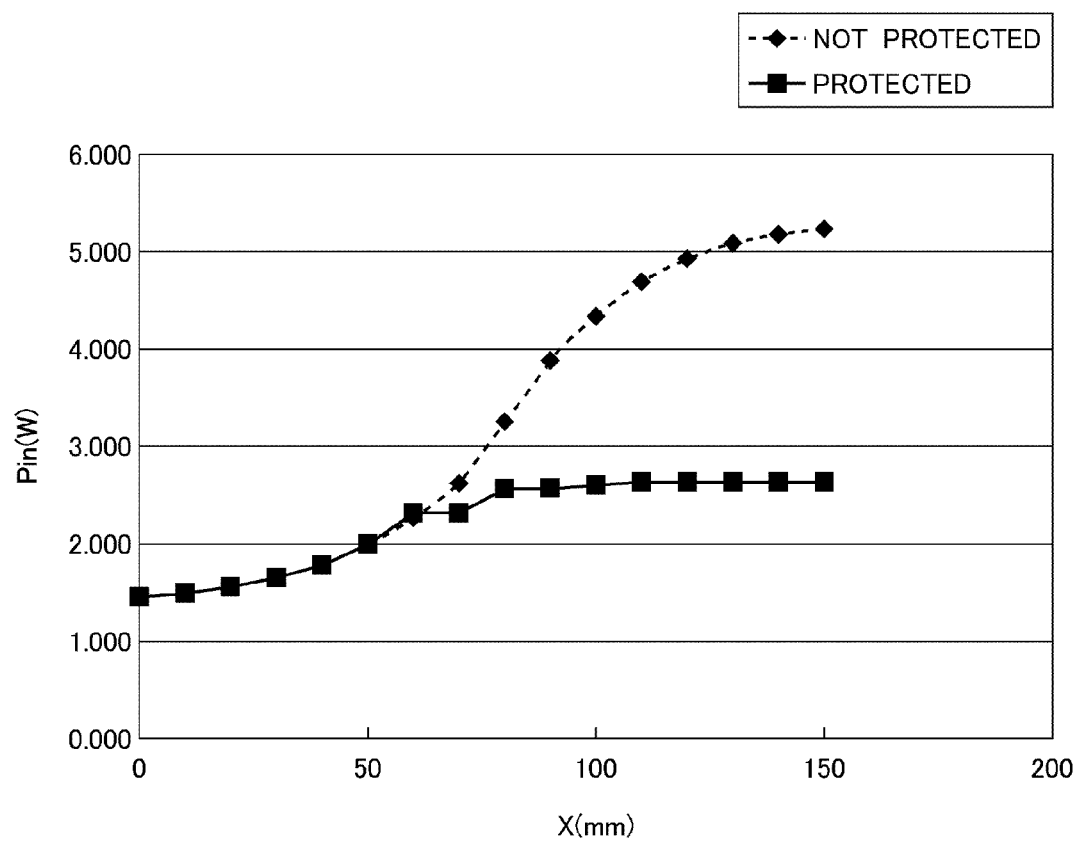
FIG. 15 is a graph representing a relationship between input power and the parameter x.
Figure 16:
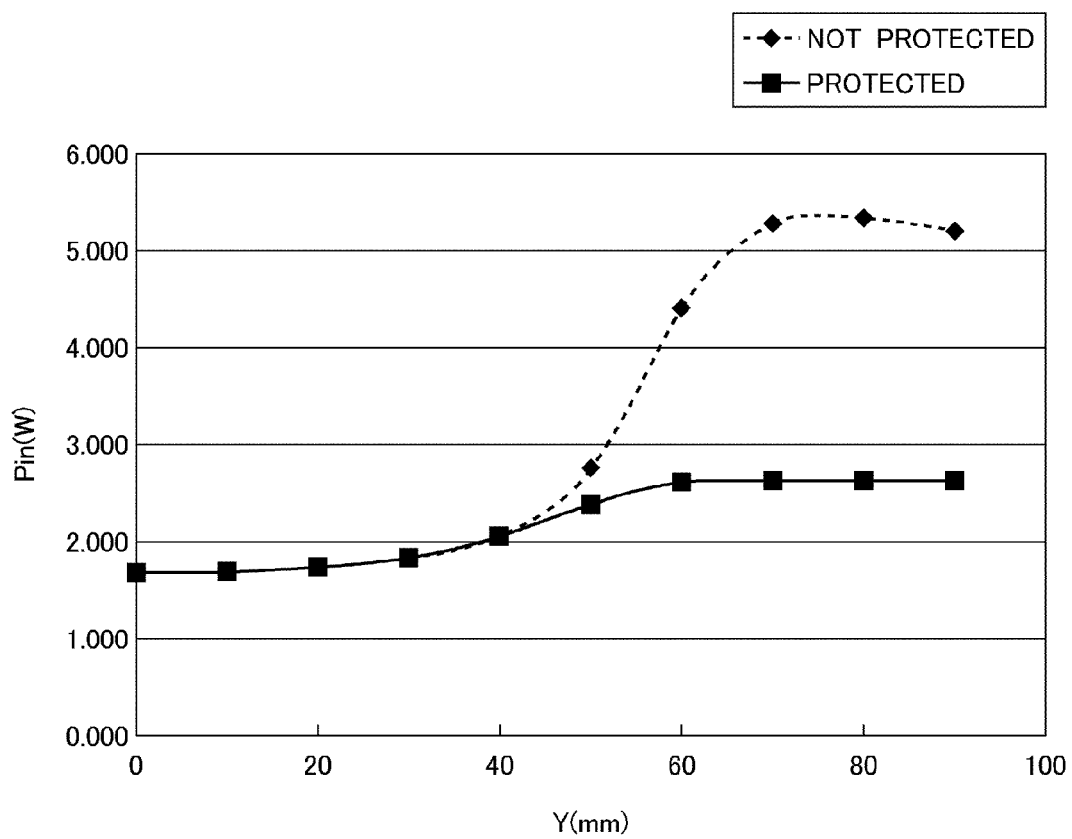
FIG. 16 is a graph representing a relationship between the input power and the parameter y.
Figure 17:
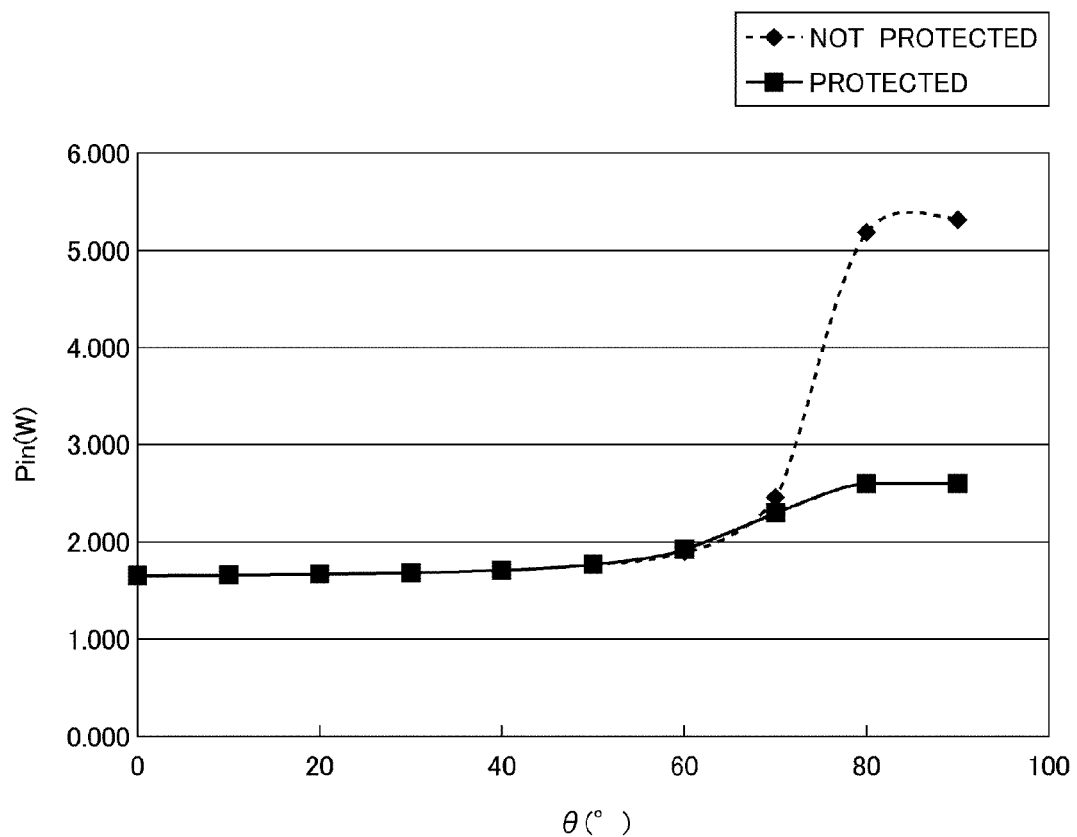
FIG. 17 is a graph representing a relationship between the input power and the parameter θ.
Figure 18:
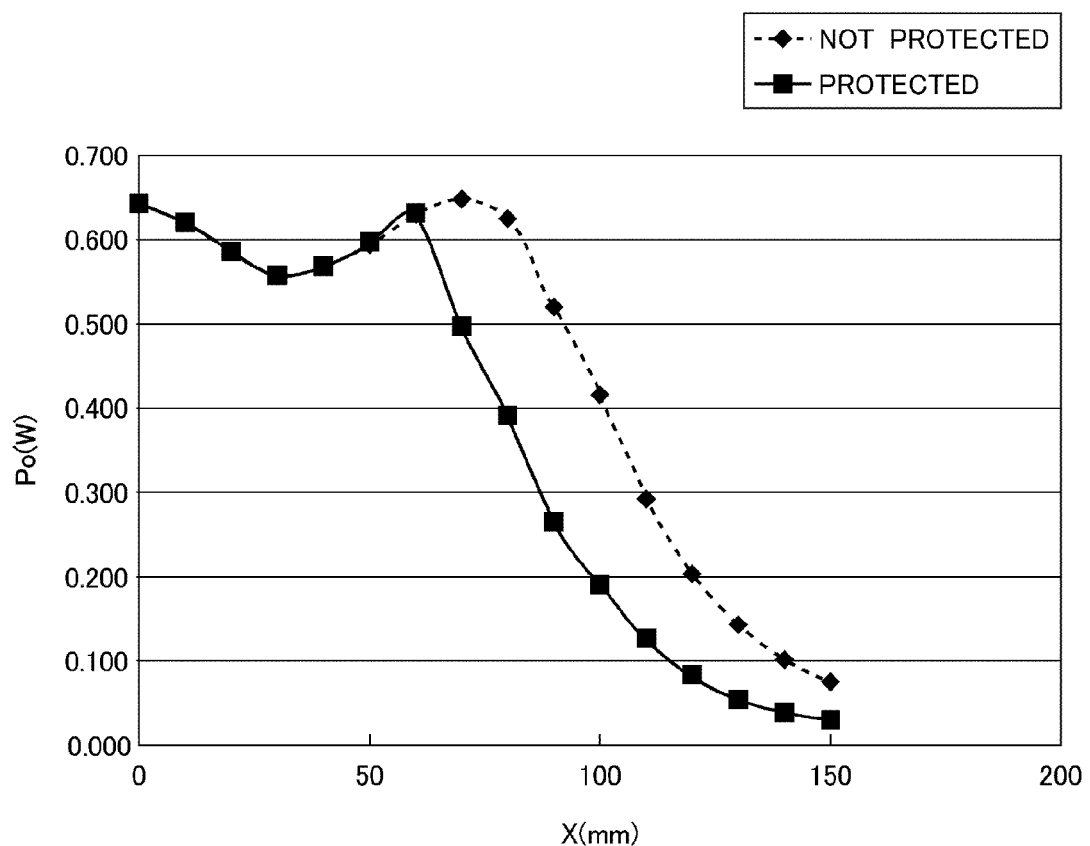
FIG. 18 is a graph representing a relationship between output power and the parameter x.
Figure 19:
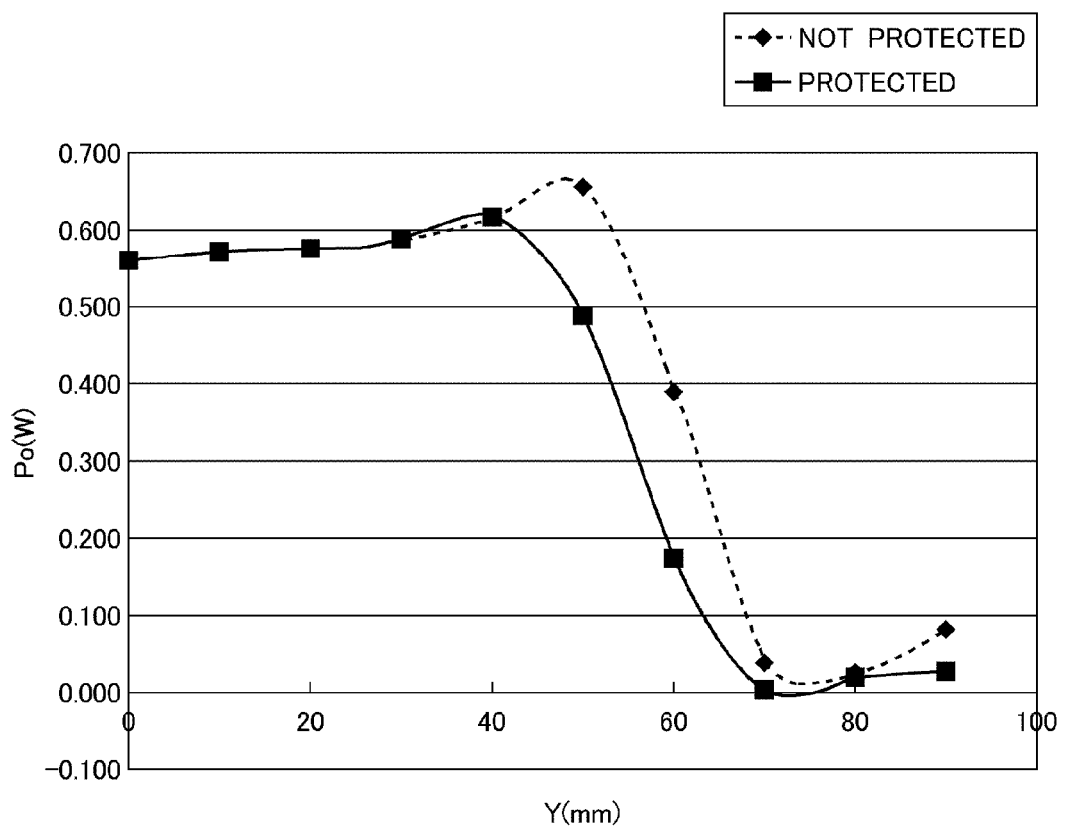
FIG. 19 is a graph representing a relationship between the output power and the parameter y.
Figure 20:
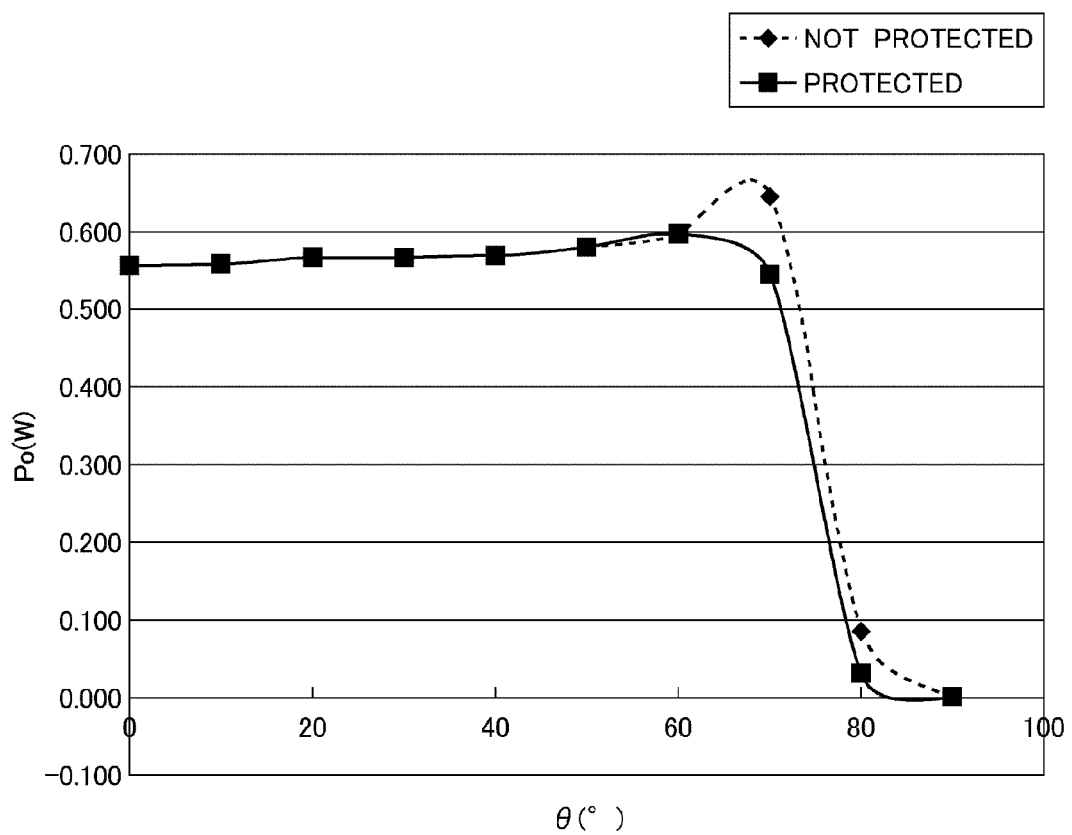
FIG. 20 is a graph representing a relationship between the output power and the parameter θ.

FIGS. 15 to 17 are each a graph representing a relationship between each of the above three parameters and input power (power supplied from the power transmission control circuit 200 to feeding coil circuit 120), and FIGS. 18 to 20 are each a graph representing a relationship between each of the above three parameters and output power (power supplied to the load LD). With regard to any of the three parameters, the more the feeding coil L2 and receiving coil L3 are shifted in position from each other, the more excessive the input power or output power becomes. The protection circuit 122 suppresses the overcurrent to protect an electronic circuit, especially, the switching transistors Q1 and Q2 from being damaged.

The wireless power transmission system 100 and application thereof to the wireless headphone system 102 have been described based on the above embodiments. When the feeding coil L2 and receiving coil L3 are significantly separated in position from each other, the overcurrent occurs in the feeding coil circuit 120. When a level of the overcurrent exceeds a rated value of the transistor, the switching transistor may burn out. In the present embodiment, the protection circuit 122 monitors the current value and aggressively increases the phase difference between the current phase and voltage phase when the current value becomes large to reduce the power transmission efficiency. Such control can prevent the overcurrent from occurring in the feeding coil circuit 120.

The present invention has been described based on the above embodiments. It should be understood by those skilled in the art that the above embodiments are merely exemplary of the invention, various modifications and changes may be made within the scope of the claims of the present invention, and all such variations may be included within the scope of the claims of the present invention. Thus, the descriptions and drawings in this specification should be considered as not restrictive but illustrative.

The "AC power" used in the wireless power transmission system 100 may be transmitted not only as an energy but also as a signal. Even in the case where an analog signal or digital signal is fed by wireless, the wireless power feeding method of the present invention may be used.

Although the "magnetic field resonance type" that utilizes a magnetic field resonance phenomenon has been described in the present embodiments, the magnetic field resonance is not essential in the present invention. For example, the present embodiments can be applied to the above-described type A (for short distance) that utilizes the electromagnetic induction, wherein the feeding coil and receiving coil are electromagnetically coupled (inductively coupled) as in the "magnetic field resonance type". Further, the present embodiments can be applied to an electric field resonance system (Jpn. Pat. Appln. Laid-Open Publication No. 2012-044857).

Although the protection circuit 122 according to the above embodiments performs phase adjustment to a lower frequency side of the resonance frequency fr1, it may perform the phase adjustment to a higher frequency side of the resonance frequency fr1 or higher frequency side of the resonance frequency fr2. In any case, by performing the phase adjustment in a direction away from the resonance frequencies fr1 or fr2, it is possible to reduce the power transmission efficiency to thereby suppress the overcurrent.

What is claimed is:

1. A wireless power feeder that wirelessly feeds power from a feeding coil to a receiving coil, comprising:
   the feeding coil;
   a power transmission control circuit that supplies AC power at a drive frequency to the feeding coil to make the feeding coil feed the AC power to the receiving coil;
   a phase detection circuit that detects a phase difference between a voltage phase of the AC power and a current phase thereof; and
   a protection circuit that monitors current flowing in the feeding coil, wherein
   the power transmission control circuit adjusts the drive frequency in accordance with the detected phase difference,
   the protection circuit adjusts the detected phase difference in an increasing direction when the current flowing in the feeding coil increases, the protection circuit converts part of AC current flowing in the feeding coil into DC current, compares a first current level signal indicating a current level of the DC current and a reference level signal indicating a threshold value, and adjusts the phase difference in the increasing direction when a value of the first current level signal is greater than that of the reference level signal, and the protection circuit does not perform adjustment of the phase difference when the value of the first current level signal is smaller than that of the reference level signal.

2. The wireless power feeder according to claim 1, wherein the increasing direction is a direction in which the drive frequency is away from a resonance point.

3. The wireless power feeder according to claim 1, wherein the phase detection circuit detects a phase difference between a current phase of current flowing in the feeding coil and a voltage phase of the AC power from the power transmission control circuit.

4. The wireless power feeder according to claim 1, wherein the protection circuit converts part of the AC current flowing in the feeding coil into a saw-tooth wave and determines an adjustment amount of the phase difference based on a result of comparison between a second current level signal indicating a current level of the saw-tooth wave and greater one of the values of the first current level signal and the reference level signal.

5. A wireless power transmission system for wirelessly feeding power from a feeding coil to a receiving coil, comprising:

the feeding coil;

a power transmission control circuit that supplies AC power at a drive frequency to the feeding coil to make the feeding coil feed the AC power to the receiving coil;

a phase detection circuit that detects a phase difference between a voltage phase of the AC power and a current phase thereof;

a protection circuit that monitors current flowing in the feeding coil;

the receiving coil; and a load circuit that includes a loading coil that is magnetically coupled to the receiving coil to receive the AC power from the receiving coil and a load that receives power from the loading coil, wherein the power transmission control circuit adjusts the drive frequency in accordance with the detected phase difference, the protection circuit adjusts the detected phase difference in an increasing direction when the current flowing in the feeding coil increases, the protection circuit converts part of AC current flowing in the feeding coil into DC current, compares a first current level signal indicating a current level of the DC current and a reference level signal indicating a threshold value, and adjusts the phase difference in the increasing direction when a value of the first current level signal is greater than that of the reference level signal, and the protection circuit does not perform adjustment of the phase difference when the value of the first current level signal is smaller than that of the reference level signal.

* * * * *